(12) United States Patent
Mallat

(10) Patent No.: US 10,863,441 B2
(45) Date of Patent: Dec. 8, 2020

(54) BLUETOOTH LOW POWER NODE LATENCY OPTIMIZATION

(71) Applicant: Silicon Laboratories Inc., Austin, TX (US)

(72) Inventor: Hannu Martti Olavi Mallat, Hyvinkää (FI)

(73) Assignee: Silicon Laboratories, Inc., Austin, TX (US)

( * ) Notice: Subject to any disclaimer, the term of this patent is extended or adjusted under 35 U.S.C. 154(b) by 84 days.

(21) Appl. No.: 16/037,099

(22) Filed: Jul. 17, 2018

(65) Prior Publication Data
US 2020/0029278 A1    Jan. 23, 2020

(51) Int. Cl.
| | |
|---|---|
| H04W 72/04 | (2009.01) |
| H04W 52/02 | (2009.01) |
| H04W 4/80 | (2018.01) |
| H04L 29/06 | (2006.01) |

(52) U.S. Cl.
CPC ......... *H04W 52/0248* (2013.01); *H04W 4/80* (2018.02); *H04W 52/0216* (2013.01); *H04W 52/0258* (2013.01); *H04L 63/062* (2013.01)

(58) Field of Classification Search
CPC ......... H04W 52/0248; H04W 52/0216; H04W 52/0258; H04W 4/80; H04W 63/062
See application file for complete search history.

(56) References Cited

U.S. PATENT DOCUMENTS

| | | | | |
|---|---|---|---|---|
| 10,268,486 | B1* | 4/2019 | Mitra | G06F 1/3287 |
| 2008/0180275 | A1* | 7/2008 | Whitaker | G01D 4/004 340/870.03 |
| 2009/0066258 | A1* | 3/2009 | Cleland | H02J 3/14 315/158 |
| 2009/0248115 | A1* | 10/2009 | Corndorf | A61N 1/37252 607/60 |
| 2010/0250989 | A1* | 9/2010 | Hamilton | G06F 1/3287 713/323 |
| 2015/0045959 | A1* | 2/2015 | McPherson | G05D 23/1905 700/276 |
| 2015/0208235 | A1* | 7/2015 | Ingale | H04W 12/04 455/411 |
| 2015/0382436 | A1* | 12/2015 | Kelly | G08C 17/02 315/131 |
| 2016/0174339 | A1* | 6/2016 | Rajagopalan | H05B 37/0218 315/152 |
| 2017/0223628 | A1* | 8/2017 | Snyder | H04W 52/0212 |
| 2017/0230784 | A1* | 8/2017 | Kwon | H04W 52/0229 |
| 2018/0075721 | A1* | 3/2018 | Oliver | H04W 4/70 |

(Continued)

*Primary Examiner* — Hassan Kizou
*Assistant Examiner* — Mahbubul Bar Chowdhury
(74) *Attorney, Agent, or Firm* — Nields, Lemack & Frame, LLC

(57) ABSTRACT

A system and method for optimizing battery life in Bluetooth low power nodes without appreciably affecting latency is disclosed. The low power node may vary its PollTimeout value based on certain criteria, including time of day, ambient conditions or input from other devices. In this way, power consumption is minimized during those times when latency is not anticipated to be problematic, while latency is reduced during other times. In another embodiment, the low power node may save preconstructed messages before going into a low power or sleep mode to minimize the time required to transmit those messages.

18 Claims, 5 Drawing Sheets

(56) References Cited

U.S. PATENT DOCUMENTS

| | | | |
|---|---|---|---|
| 2018/0144587 A1* | 5/2018 | Stogel | G08B 3/10 |
| 2018/0249701 A1* | 9/2018 | Sponholz, III | A01M 31/06 |
| 2019/0173675 A1* | 6/2019 | Kaufman | H04L 9/0822 |
| 2019/0182645 A1* | 6/2019 | Joseph | H04W 4/60 |

* cited by examiner

BLUETOOTH LOW POWER NODE LATENCY OPTIMIZATION

FIELD

This disclosure describes systems and methods for optimizing latency in low power Bluetooth nodes.

BACKGROUND

Bluetooth is one of the protocols that is being employed for the Internet of Things (IoT). In certain embodiments, the Bluetooth device may be a low power node (LPN), which is a low power network device. For example, the low power node may operate on battery power. Consequently, low power operation is essential to the battery life of the node. Therefore, the more often that the Bluetooth device enters a low power or sleep mode, the longer its battery life will be. Unfortunately, devices in a low power or sleep mode typically have very slow response times to commands. The time between the issuance of a command to execution of that command may be referred to as latency.

The Mesh Profile specification 1.0, which is a public specification developed by members of the Bluetooth Special Interest Group (SIG) specifies the protocol a low power node uses to establish a relationship with a friend node in the network. The friend node caches messages destined for the LPN while the LPN sleeps. The specification also defines the protocol the LPN uses to retrieve cached messages from the friend node when the device wakes up.

The specification describes the communication protocol as well as upper and lower bounds for certain parameters, such as PollTimeout, which is the upper bound on how often must LPN wake up and poll for cached messages. Other parameters include ReceiveDelay, which specifies the minimum time after the LPN sends the request that the friend node may send a response; and ReceiveWindow, which specifies the period of time, starting after the ReceiveDelay, during which the LPN will wake up to wait for the response. The specification leaves the selection of optimal values of these parameters as implementation details.

To minimize power consumption, the interval between polls (PollTimeout) should be long to maximize the amount of time that the LPN is in a low power or sleep mode. However, if the LPN has latency requirements, the poll interval might have to be much shorter. This is especially true if there is an element of human interaction in the system that the LPN is part of. For example, the maximum tolerated latency between a user's action and the LPN's reaction to it may be 1-2 seconds at most.

This conflict in requirements leaves designers to either sacrifice battery life or perceived latency. Therefore, it would be beneficial if there were a system and method for optimizing battery life without affecting latency. Further, it would be beneficial if the system and method was adaptable, based on the function of the low power node.

SUMMARY

A system and method for optimizing battery life in Bluetooth low power nodes without appreciably affecting latency is disclosed. The low power node may vary its PollTimeout value based on certain criteria, including time of day, ambient conditions or input from other devices. In this way, power consumption is minimized during those times when latency is not anticipated to be problematic, while latency is reduced during other times. In another embodiment, the low power node may save preconstructed messages before going into a low power or sleep mode to minimize the time required to transmit those messages.

According to one embodiment, a low power network device is disclosed. The low power network device comprises a wireless interface; a processing unit; a memory device in communication with the processing unit, the memory device comprises instructions, which when executed by the processing unit, enable the low power network device to: establish a default value for a PollTimeout parameter, the PollTimeout parameter being an upper bound on how often the low power network device must return to an active mode and poll for cached messages; determine a duration of time where a reduced value of the PollTimeout parameter, less than the default value, is to be employed; and use the reduced value during the duration of time and use the default value during other times. In certain embodiments, the low power network device comprises a timer, and the duration of time is determined based on data from the timer. In some further embodiments, the low power network device determines sunrise and sunset times and uses the data from the timer to determine whether it is daytime or nighttime. In certain embodiments, the low power network device comprises a light sensor, and the duration of time is determined based on data from the light sensor. In other embodiments, the low power network device receives a message from a second network device instructing it to use the reduced value.

According to another embodiment, a network is disclosed. The network comprises a low power network device having a wireless network interface and a memory device to store a default value of a PollTimeout parameter; a second network device having a wireless network interface; and a friend node, having a wireless network interface; wherein the second network device transmits a first message using the wireless network interface, to the low power network device, instructing the low power network device to use a reduced value of the PollTimeout parameter, the reduced value being less than the default value; and wherein the friend node caches the first message for the low power network device if the low power network device is in a sleep mode when the second network device transmits the message. In certain embodiments, the low power network device comprises a night light. In some embodiments, the network comprises a movement sensor having a wireless network interface; wherein the movement sensor transmits a second message using the wireless network interface to the low power network device instructing it to enable the night light. In some further embodiments, the second network device transmits a third message using the wireless network interface to the movement sensor, the third message indicating day or night. In some further embodiments, the movement sensor only transmits the second message if it detects movement and determines that it is night time. In yet other further embodiments, the network comprises a second low power network device, wherein the second network device transmits the first message as a multicast message to the low power network device and the second low power network device. In other further embodiments, the movement sensor transmits the second message as a multicast message to the low power network device and the second low power network device. In some embodiments, the second network device transmits the first message when it determines that it is night time. In some embodiments, the second network device transmits another message to the low power network device instructing the low power network device to use the default value of the PollTimeout parameter.

In another embodiment, a method of reducing latency in a low power network device is disclosed. The low power network device has a software stack that is used to transmit and receive messages over a wireless network interface. The method comprises determining the one or more most likely messages that the low power network device will transmit after awakening from hibernation mode; constructing the one or more most likely messages in a first portion of memory that retains power during hibernation mode; and entering hibernation mode, wherein a processing unit and a second portion of the memory in the low power network device are powered off. In some embodiments, the method further comprises determining, after awakening from hibernation mode and before initializing the software stack, the reason for the awakening; and if the reason is expected, sending one of the constructed messages before initializing the software stack. In some embodiments, the method further comprises, if the reason is not expected, initializing the software stack; and creating and transmitting a new message after the software stack is initialized. In certain embodiments, the one or more most likely messages are constructed using encryption keys. In some embodiments, the one or more most likely messages are constructed using a unique sequence number.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
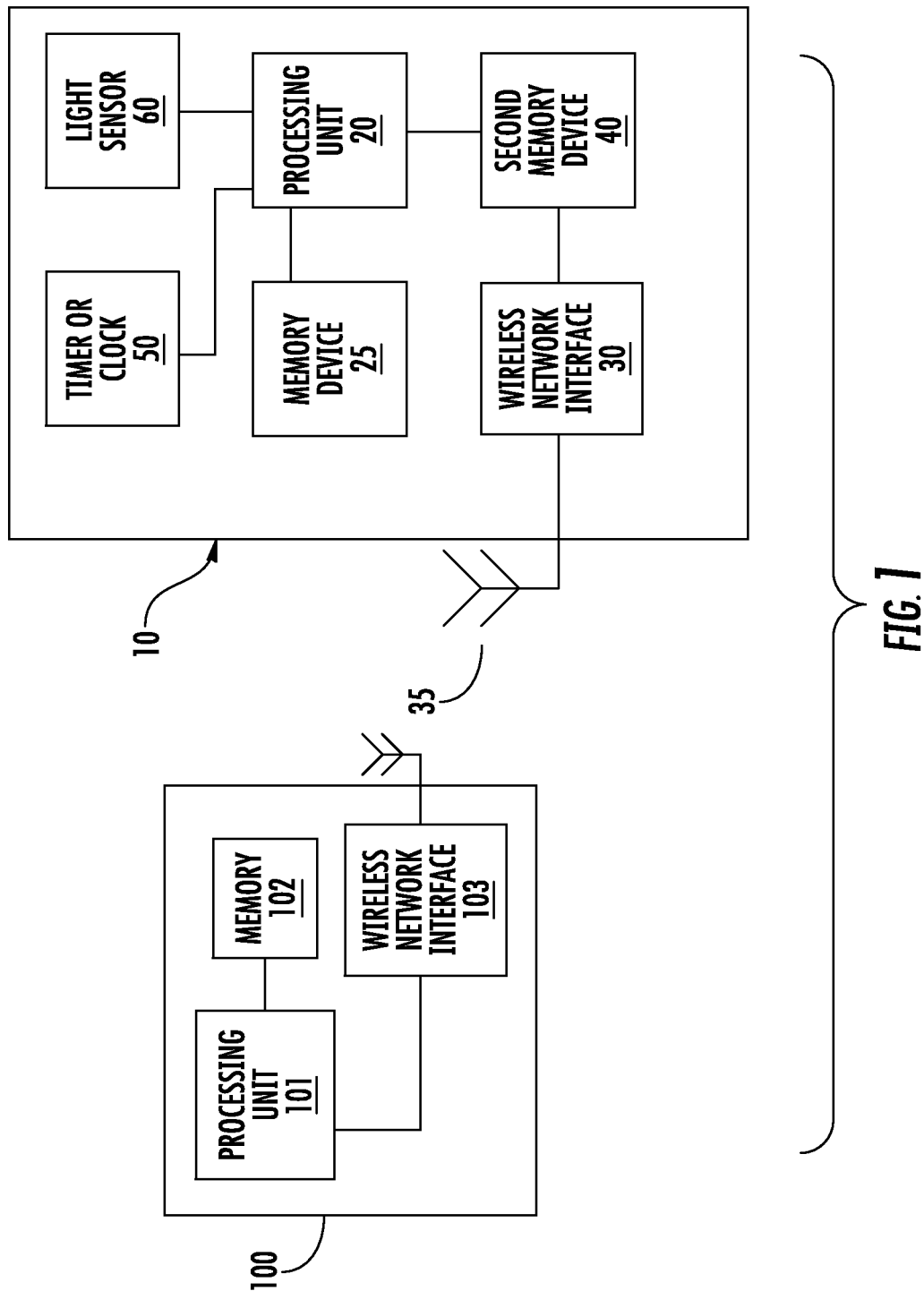
FIG. 1 is a block diagram of a representative low power network device.

FIG. 1 shows a block diagram of a representative network device, also referred to as a low power network device 10 or a low power node (LPN).

The low power network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the low power network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The low power network device 10 also includes a wireless network interface 30, which may be a wireless interface including an antenna 35. The wireless network interface 30 may support any wireless network, including BLUETOOTH®, BLUETOOTH® low energy, ZIGBEE®, Thread, a cellular protocol, such as 3G, GCM, CDMA, 4G, LTE, or other protocols. The wireless network interface 30 may support several power states. During transmission mode, the wireless network interface 30 is transmitting using its radio transceiver. This may be the highest power mode. During receiving mode, the wireless network interface 30 is powered, but the radio transceiver is not actively transmitting. This results in a lower power consumption. In a lower power mode, the radio transceiver may be disabled such that the low power network device 10 cannot send or receive messages. The time to return from this lower power mode to the receiving mode or transmission mode may be relatively small. In the lowest power mode, the wireless network interface 30 is turned off.

The low power network device 10 may include a second memory device 40 in which data that is received by the wireless network interface 30, and data that is to be transmitted by the wireless network interface 30, is stored. This second memory device 40 is traditionally a volatile memory. The processing unit 20 has the ability to read and write the second memory device 40 so as to communicate with the other nodes in the network. Although not shown, the low power network device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the low power network device 10. The instructions contained on this second computer readable media may be downloaded onto the memory device 25 to allow execution of the instructions by the low power network device 10.

In certain embodiments, the low power network device 10 may also include a timer or clock 50. In certain embodiments, the low power network device 10 may include a light sensor 60. The timer or clock 50 and the light sensor 60 may be in communication with the processing unit 20, such that the processing unit 20 can receive data or interrupts from these components.

While the processing unit 20, the memory device 25, the wireless network interface 30, the second memory device 40, the timer or clock 50, and the light sensor 60 are shown in FIG. 1 as separate components, it is understood that some or all of these components may be integrated into a single electronic component. Rather, FIG. 1 is used to illustrate the functionality of the low power network device 10, not its physical configuration.

As described above, a friend node 100 is used to cache messages for the low power network device 10 while it is in sleep mode. The friend node 100 comprises a processing unit 101 with an associated memory 102. The memory 102 may be a volatile memory, such as DRAM, or may be non-volatile, such as FLASH memory, magnetic storage or optical storage. The memory 102 contains instructions and programs, which when executed by the processing unit 101, enable the friend node 100 to perform the functions described herein. The memory 102 may also be used to store the messages intended for the low power network device 10. The friend node 100 also comprises a wireless network interface 103, which utilizes the same protocol as the wireless network interface 30 of the low power network device 10. The friend node 100 can be any suitable network device with a wireless interface.

The low power network device 10 may be configured to support several modes of operation. Specifically, the processing unit 20 may have a plurality of different power states. In active mode, the processing unit 20 is operating normally. In deep sleep mode, the processing unit 20 is in a sleep mode, but can be awaken quickly. Further, the contents of the memory device 25 are retained. In hibernation mode, the processing unit 20 is powered off, and only a limited amount of the contents of the memory device 25 are retained. In certain embodiments, the processing unit 20 may be woken up from deep sleep mode or hibernation mode by the timer or clock 50, or by an external interrupt.

Thus, the latency is lowest in active mode. The latency is also small in the sleep mode and may be on the order of 100 microseconds or less. The latency in hibernation mode is very long because nearly all of the hardware components are powered off and need to be restarted from scratch. Additionally, the software stack essentially needs to be rebooted, including loading all persistent configuration from FLASH. Consequently, the latency may be over 100 milliseconds. However, advantageously, the power consumption of the processing unit 20 may be up to two orders of magnitude times less in hibernation mode than deep sleep mode and up to six orders of magnitude less than active mode.

As stated above, low power nodes (LPNs) may enter a lower power or sleep mode to conserve power. To minimize power consumption, it would be advantageous if the processing unit 20 could utilize hibernation mode during this sleep mode. While hibernation mode certainly minimizes power consumption, it adversely affects latency, as described above.

In operation, if the low power network device 10 is in sleep mode, any messages to the low power network device 10 will be claimed and cached by the friend node 100. When the low power network device 10 awakens, it polls the friend node 100 to determine if there are any messages that were transmitted while the low power network device 10 was in sleep mode.

As described above, the low power network device 10 may poll the friend node 100 at regular intervals which are defined by the PollTimeout parameter. Thus, if a node sends a message to the low power network device 10 just as it enters sleep mode, the low power network device 10 will not receive that message until the next time it awakens, which may be the time defined by the PollTimeout parameter.

In addition to the PollTimeout value, there is also the time required to exit hibernation mode. Therefore, the maximum latency that may occur between the issuance of a command and the receipt of that command by the LPN may be given by:

PollTimeout+WakeTime, where PollTimeout is the parameter defined in the Mesh Profile specification and WakeTime is a device specific value that is a function of the sleep mode, the hardware architecture and the structure of the software on the device.

Thus, latency can be adjusted by reducing either of these parameters.

In certain embodiments, the present system uses a reduced value of the PollTimeout parameter at selected times. As described above, the Mesh Profile specification establishes an upper bound on the PollTimeout parameter. According to the specification, the PollTimeout parameter may have a value between 1 second and 4 days. However, the specification permits the LPN to poll the friend node at a time interval less than the value specified by the PollTimeout parameter. In other words, if the PollTimeout parameter is set to 1 hour, it is acceptable for the LPN to poll the friend node 100 every 30 minutes. However, it is unacceptable to poll the friend node 100 every 2 hours.

In one illustrative example, assume that the low power network device 10 is being used as a night light, which is activated by movement. This movement may be detected by the low power network device 10 or by a separate device, such as an infrared (IR) sensor. The requirements for such a device may be that it does not have to illuminate at all during the daytime, or when the ambient light is above a certain threshold. However, at night, the LPN must turn on the lighting within 1-2 seconds after the movement is detected.

Thus, to minimize power consumption, the PollTimeout parameter should be set to a long time period, such as 1 hour or more. This may be referred to as the default value of the PollTimeout parameter. Thus, during the daylight, the LPN wakes up once every hour. Of course, this value is merely illustrative and any other suitable values may be used. However, during the times when the LPN may be needed to illuminate the night light, the LPN polls at an interval that is much smaller than the default value of the PollTimeout parameter. For example, the LPN may use a value as small as one second. This value may be referred to as the reduced value. Note that the default value of the PollTimeout parameter is not changed. Rather, the LPN simply uses a smaller interval between polling operations.

Figure 2:
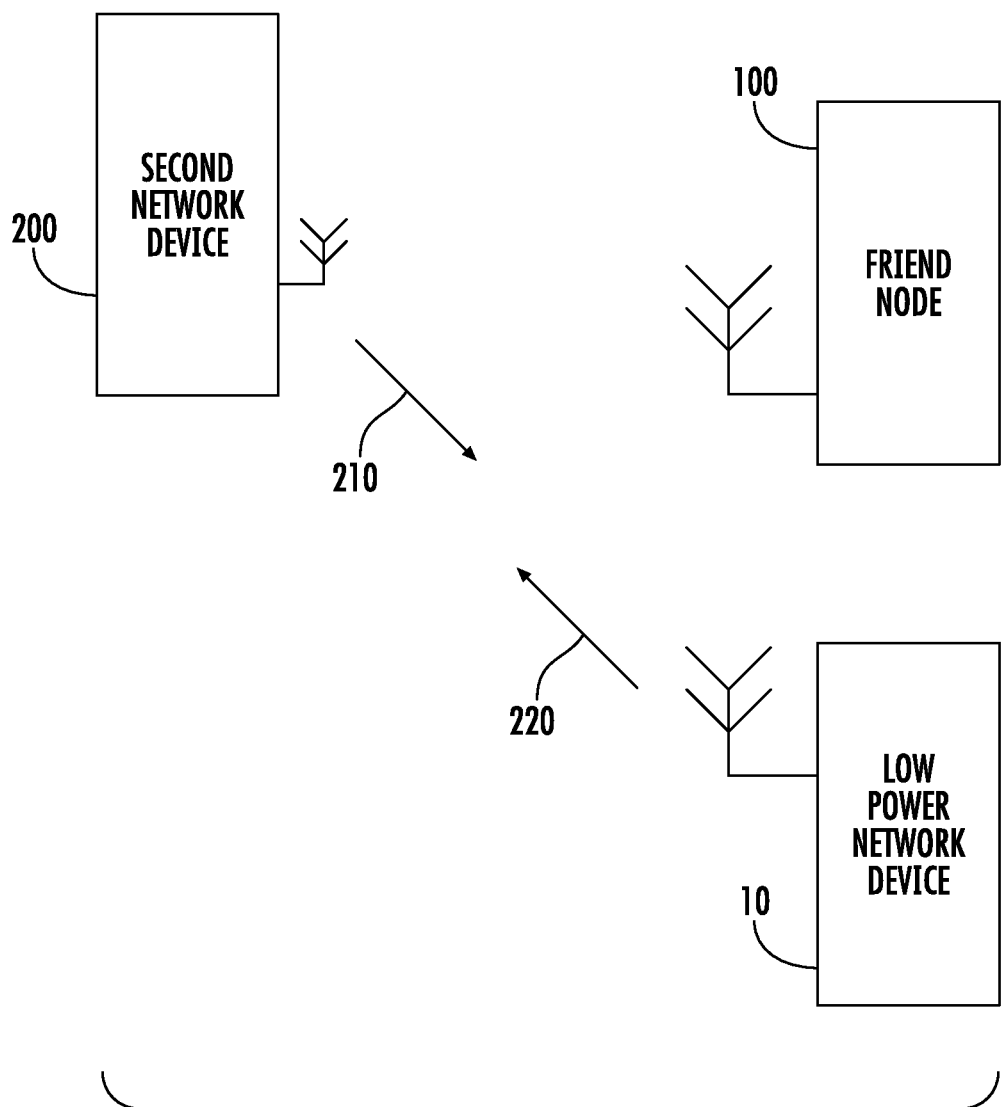
FIG. 2 illustrates the communication between a low power network device, a friend node and a second network device.

The transition between the default value of the PollTimeout parameter and the reduced value may be performed in a number of ways. In one embodiment, shown in FIG. 2, a second network device 200 may send a message or command 210 to the low power network device 10 to instruct the low power network device 10 to use a certain value for the PollTimeout parameter.

Like the other devices, the second network device 200 comprises a processing unit with an associated memory. The memory may be a volatile memory, such as DRAM, or may be non-volatile, such as FLASH memory, magnetic storage or optical storage. The memory contains instructions and programs, which when executed by the processing unit, enable the second network device 200 to perform the functions described herein. The second network device 200 also comprises a wireless network interface, which utilizes the same protocol as the wireless network interface 30 of the low power network device 10. The second network device 200 can be any suitable network device with a wireless interface.

As described above, if the low power network device 10 is in sleep mode at this time, the friend node 100 will cache this message on behalf of the low power network device 10. In other embodiments, the second network device 200 may send a message or command instructing the low power network device 10 to use its default value or its reduced value for the PollTimeout parameter. In these embodiments, the second network device 200 may use any suitable criteria to determine when the message or command 210 is to be sent to the low power network device 10. For example, the second network device 200 may utilize the time of day, or the ambient conditions, such as lighting and/or temperature.

In another embodiment, the low power network device 10 may send a message 220 to the second network device requesting the time of day, the current level of ambient lighting, or another suitable parameter. The low power network device 10 may then use the information received from the second network device 200 to select the proper value for the PollTimeout parameter.

In another embodiment, the low power network device 10 may have an internal timer or clock 50, as shown in FIG. 1. The low power network device 10 may use the timer or clock 50 as an interrupt to wake the processing unit 20 from the deep sleep or hibernation mode. Once awake, the low power network device 10 may determine the time of day, and adjust the value used for the PollTimeout parameter accordingly. In certain embodiments, the low power network device 10 may use an algorithm to determine the times associated with sunrise and sunset, based on latitude and time of year. This algorithm may be used to determine the period of time each day that the reduced value of the PollTimeout parameter should be used. In another embodiment, the low power network device 10 may use a table to determine the proper period of time each day that the reduced value of the PollTimeout parameter should be used. For example, the table may hold sunrise and sunset times as a function of month, week or some other parameter.

In another embodiment, the low power network device 10 includes a light sensor 60. The low power network device 10 may poll the light sensor 60 periodically to determine the ambient lighting in the building. Using this information, the low power network device 10 may determine when the reduced value of the PollTimeout parameter should be used. In a further embodiment, the low power network device 10 may utilize the data from the light sensor 60 in conjunction with the time of day to control its operation.

Thus, in certain embodiments, the low power network device 10 uses at least two different values for the PollTimeout parameter, allowing the low power network device 10 to conserve significant amounts of power during periods of times where it has been predetermined that the low power network device 10 will not be used.

Figure 3:
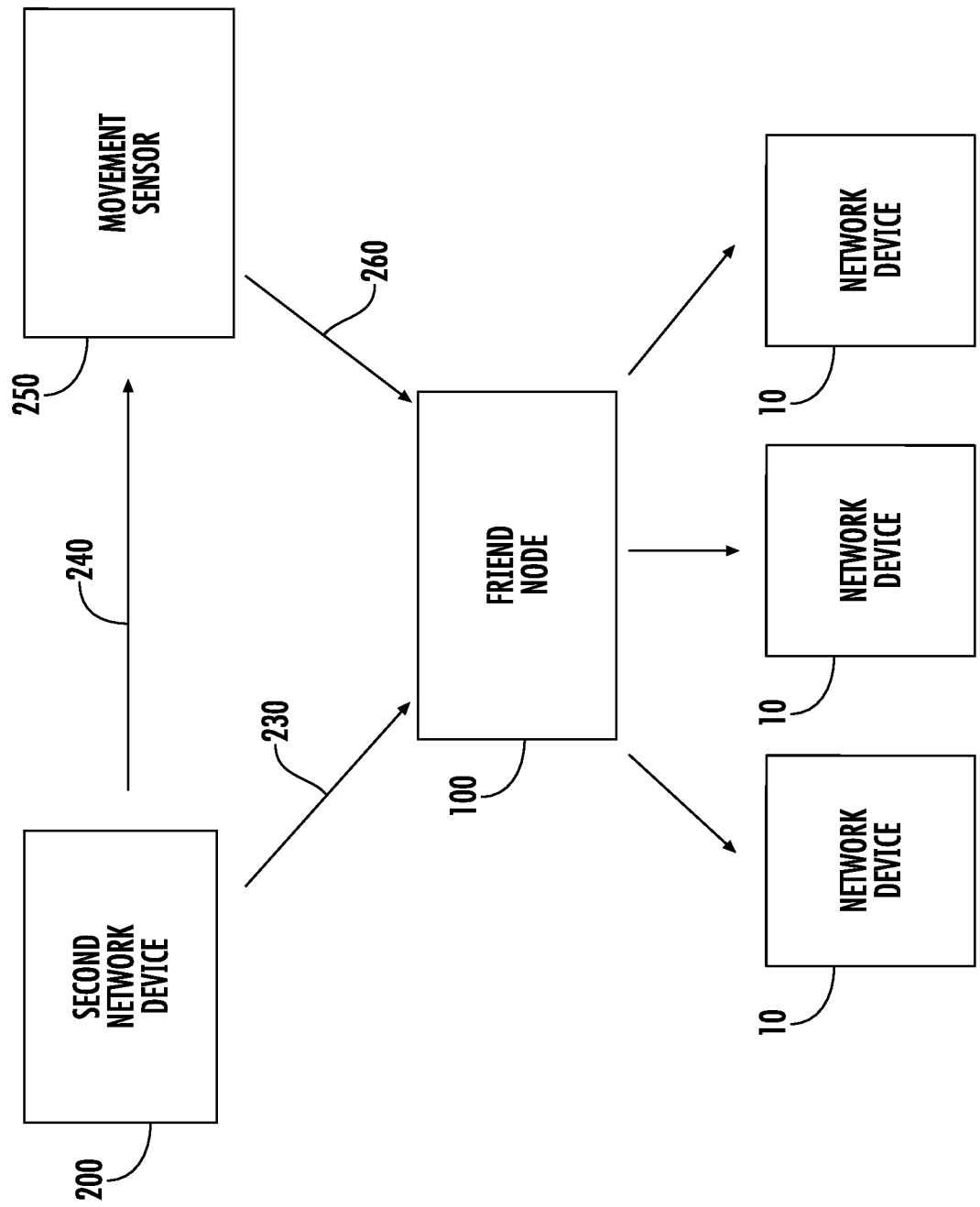
FIG. 3 represents the topology and information flow according to one embodiment.
Figure 4:
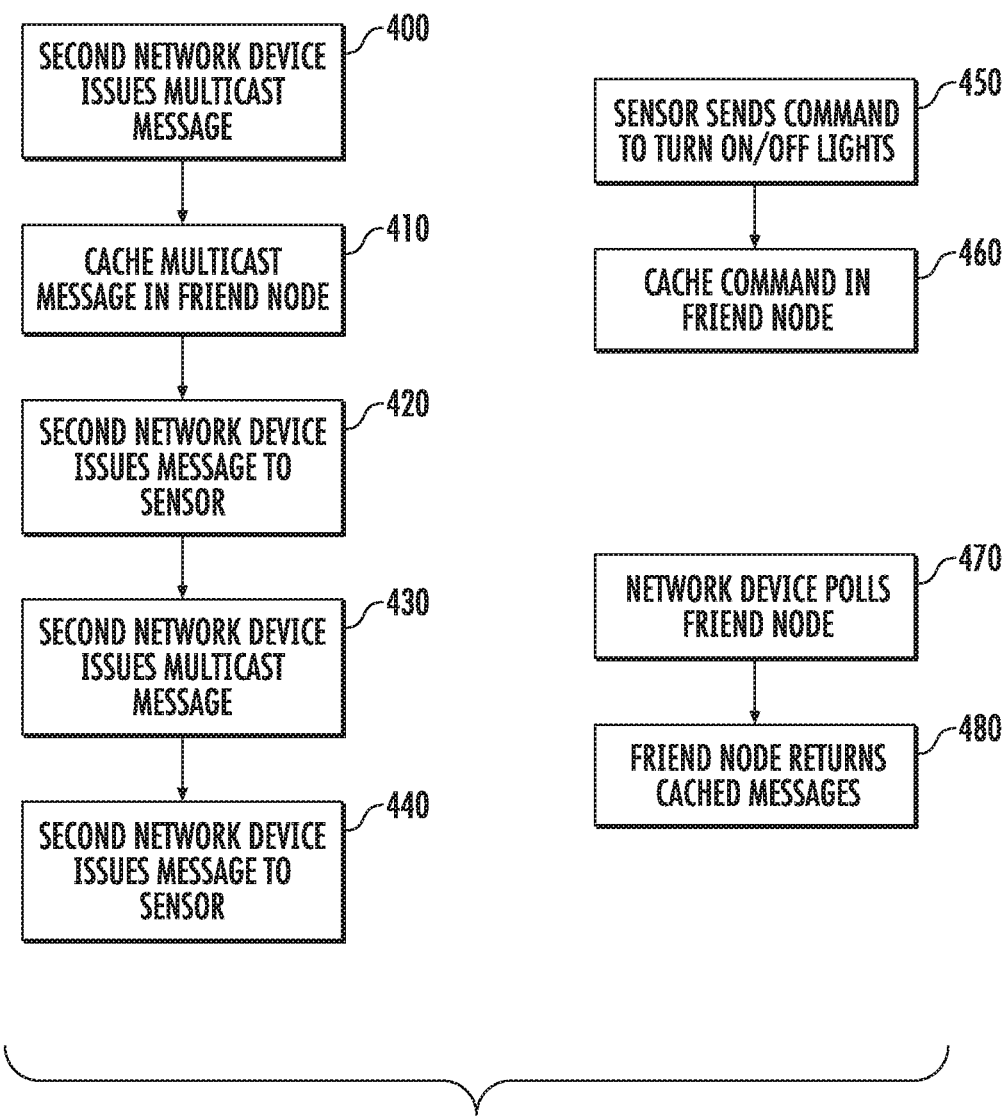
FIG. 4 illustrates the operation of the system of FIG. 3.

FIG. 3 shows an example of this concept in operation. FIG. 4 illustrates a flowchart showing the sequence of actions. Three separate flowcharts are shown. Processes 400-440 refer to the second network device 200. Processes 450-460 refer to the movement sensor 250. Processes 470-480 refer to the low power network device 10. In the embodiment shown in FIG. 3, there are three network devices 10, which are part of the same multicast group, referred to as the nightlight group. Further, each of these network devices 10 operates as a night light. Second network device 200 is responsible for commanding the network devices 10 to switch between daytime and nighttime modes. To do this, the second network device 200 may issue a multicast message 230 to the nightlight group, as shown in Process 400. This multicast message 230 is cached by the friend node(s) 100, as shown in Process 410. Additionally, the second network device 200 may also send a day/night switch command 240 to movement sensor 250, as shown in Process 420. This day/night switch command 240 may instruct the movement sensor 250 to only detect movement during the night time.

The movement sensor 250 may be another network device having a wireless network interface, a processing unit and an associated memory, similar to the other network devices described herein. The associated memory contains instructions that allow the movement sensor to perform the functions described herein.

The friend node 100 caches the multicast message 230 for the network devices 10 in the nightlight group until they poll their friend node 100. Note that one friend node 100 is illustrated in FIG. 3, but there can be several friend nodes in the network, each handling a subset of network devices 10.

The movement sensor 250 commands the network devices 10 in the nightlight group to turn on if it detects movement during nighttime. To do this, the movement sensor 250 sends a multicast message 260 to the nightlight group, as shown in Process 450. This multicast message 260 is cached by the friend node(s) 100, as shown in Process 460.

When the network devices 10 wake up, they query the friend node 100 to retrieve messages that were cached while they were sleeping, as shown in Processes 470-480. In some cases, these messages may instruct the network devices 10 to change their value of the PollTimeout parameter (in the case of a cached version of multicast message 230). In other cases, these messages may instruct the network devices 10 to turn on or off their lights (in the case of a cached version of multicast message 260).

At a later time, the second network device 200 may send a second multicast message to instruct the low power network devices 10 to return to the default value of the PollTimeout parameter, as shown in Process 430. As described above, this multicast message may be cached by the friend node 100, and retrieved by the low power network devices 10 at a later time. Upon receiving this message, the low power network devices 10 will use the default value of PollTimeout parameter until otherwise instructed. This second multicast message may correspond to daybreak or some other condition.

Further, the second network device 200 may send a second multicast message to movement sensor 250 instructing it to cease operation, since the nightlight group does not operate during the daytime. This is shown in Process 440.

While FIG. 3 and FIG. 4 describe multicast messages, it is understood that the messages can also be unicast if desired. Thus, the type of message sent by the second network device 200 and the movement sensor 250 is not limited by this disclosure.

Further, while this example relates to lighting systems where daytime and nighttime are the factors that determine when the default and reduced values of the PollTimeout parameter are used, the disclosure is not limited to this configuration. For example, lighting systems may use the day of the week as a factor in determining when the default and reduced values of the PollTimeout parameter are used. Other types of systems may use different factors.

As described above, there are two parameters that help determine latency: the value of the PollTimeout parameter and the WakeTime. The above description explains how the PollTimeout parameter may be manipulated. However, in certain embodiments, the present system may also or alternatively reduce the WakeTime.

For example, as described above, in hibernation mode, the processing unit 20 and the wireless network interface 30 of the low power network device 10 are powered off. Further, only a limited amount of the contents of the memory device 25 are retained. Thus, after the low power network device 10 awakens from hibernation mode, it must power up various components. It must also completely reboot its software stack. Thus, to transmit a message after exiting hibernation mode, the processing unit 20 must:

Initialize the wireless network interface 30;
Insure the oscillator is stable;
Initialize the link layer of the software stack;

Initialize the network/application layer of the software stack; and

Create a message, which requires:
encryption and authentication using the application/network key; and
allocation of a unique sequence number.

Typically, the keys and sequence numbers are stored in FLASH memory, and must be read from FLASH after the software stack has been initialized. Further, since only a limited amount of the contents in memory device 25 are retained, the initialization of the software stack may also require the reading of the contents of a non-volatile storage device, such as FLASH memory, which may be a relatively lengthy process.

Consequently, it may take in excess of 50-100 milliseconds to return the low power network device 10 to fully operational status after awakening from hibernation mode.

To attempt to minimize this time, the low power network device 10 may preconstruct the most common messages that it anticipates transmitting after awakening from hibernation.

For example, for some devices, after awakening, the first transmission is a message to the friend node to retrieve any commands that may have been sent to the low power network device 10 while it was in sleep mode.

In other embodiments, the low power network device 10 may be awakened by an interrupt, such as a button switch. In response, the low power network device 10 may send a command to an application specific message. For example, upon detection of a button push, the low power network device 10 may send a command to a light group instructing them to turn on/off the lights.

In other embodiments, the low power network device 10 may be awakened by a timer. In response, the low power network device 10 may query an external sensor, such as a temperature sensor or a light sensor.

In other words, for many network devices 10, there may be a limited number of messages that the device will transmit upon awakening from the hibernation mode.

Thus, to minimize the amount of time associated with WakeTime, the low power network device 10 may construct one or more of the most common messages prior to entering hibernation mode. These messages are stored in the portion of the memory device 25 that is retained during hibernation mode. When the low power network device 10 awakens from hibernation mode, it determines whether any of the preconstructed messages that were stored are applicable. If so, that message is transmitted prior to the software stack being initialized.

Figure 5:
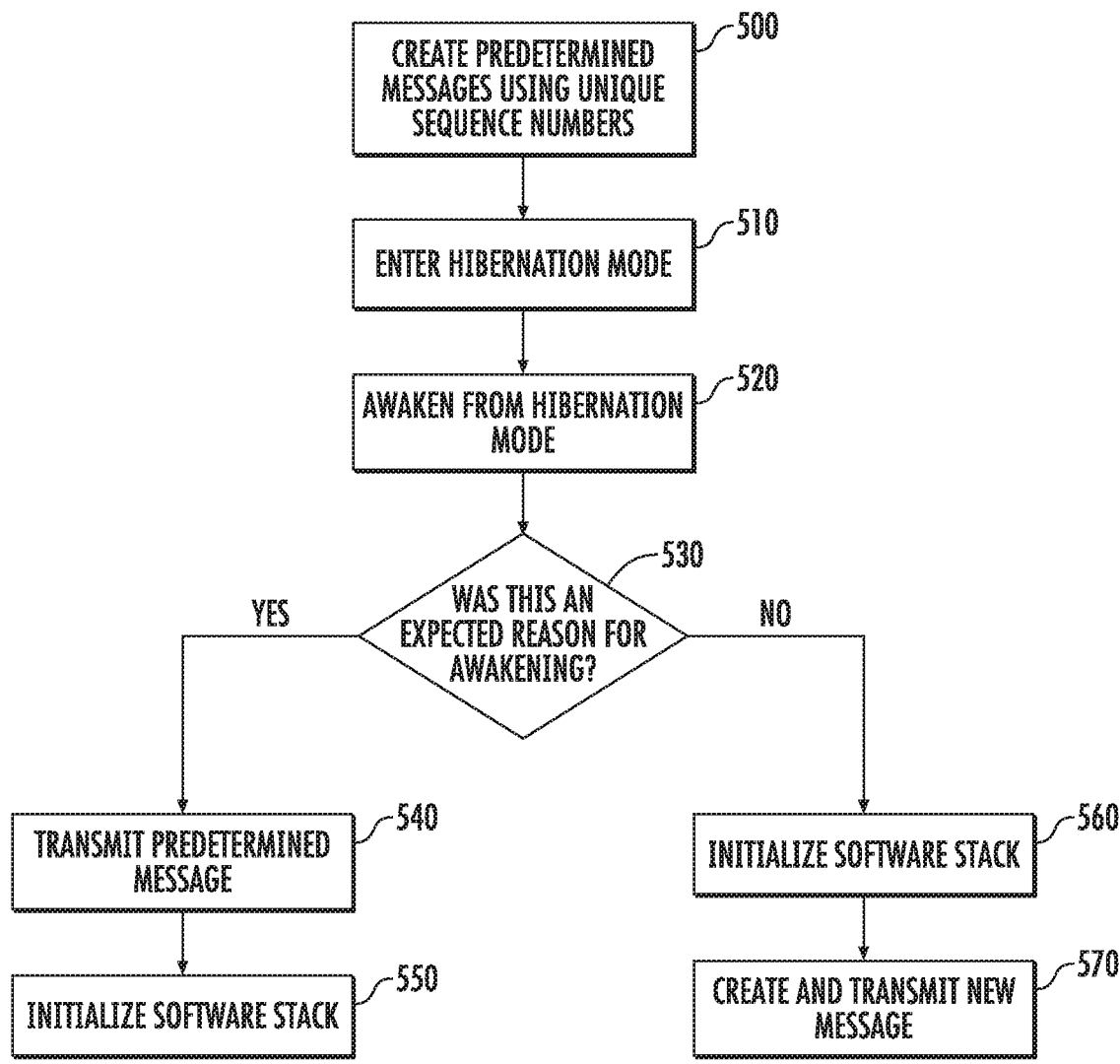
FIG. 5 shows the operation of the low power network device according to another embodiment.

A flowchart of this operation is shown in FIG. 5. First, prior to entering hibernation mode, the low power network device 10 creates one or more preconstructed messages, as shown in Process 500. These messages may be any message or command, such as those described above. To create this message, the low power network device 10 uses the encryption keys. Additionally, the low power network device 10 associates a unique sequence number with each of these preconstructed messages. These preconstructed messages are then stored in the first portion of the memory device 25 that remains powered during hibernation mode. After these preconstructed messages have been created and stored in the memory device 25, the low power network device 10 enters hibernation mode, as shown in Process 510. As described above, in hibernation mode, the processing unit 20, the second portion of the memory device 25, the wireless network interface 30 and other components are powered off.

Some time later, the network device 10 awakens from hibernation mode, as shown in Process 520. There may be many reasons that the network device 10 was awoken. This include expiration of a timer, hardware interrupt or another cause. Upon awakening, and before initializing the software stack, the processing unit 20 determines whether the network device 10 has been awakened for an expected reason, as shown in Process 530. An expected reason is defined as one in which the network device 10 has an associated preconstructed message. If the network device 10 was awoken for an expected reason, the network device 10, after initializing the wireless network interface 30, sends one of the one or more preconstructed messages via the wireless network interface 30, as shown in Process 540. After this message has been sent, the processing unit 20 then initializes the software stack, as shown in Process 550. In this way, the message is sent prior to the initialization of the software stack, potentially saving tens of milliseconds.

If, however, the network device 10 was awoken for an unexpected reason, the processing unit 20 first initializes the software stack, as shown in Process 560. It then creates and transmits the message, as shown in Process 570.

Thus, this embodiment allows the network device 10 to anticipate the most likely messages that it will be required to transmit upon waking, and to create and save these preconstructed messages prior to entering hibernation mode. In reviewing Processes 540-570 of FIG. 5, it can be seen that the difference in the time required for the network device 10 to transmit the first message is approximately equal to the time required to complete Process 560. This time may be in the order of tens of milliseconds or more. In some embodiments, the method of FIG. 5 may reduce the time required to transmit the first message by over 100 milliseconds.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A low power network device, comprising:
a wireless interface;
a processing unit;
a memory device in communication with the processing unit, the memory device comprises instructions, which when executed by the processing unit, enable the low power network device to:
utilize a software stack to transmit and receive messages over the wireless network interface;
establish a default value for a PollTimeout parameter, the PollTimeout parameter being an upper bound on how often the low power network device must return to an active mode and poll for cached messages, wherein the low power network device has a hibernation mode and the PollTimeout parameter determines a maximum time that the low power network device remains in the hibernation mode and wherein the low power network device is in the hibernation mode prior to polling for the cached messages;

determine a duration of time where a reduced value of the PollTimeout parameter, less than the default value, is to be employed;

use the reduced value during the duration of time and use the default value during other times;

construct a message in a portion of memory that retains power during hibernation, prior to entering the hibernation mode; and transmit the message after the low power network device returns to active mode after having remained in hibernation mode for a duration defined by the default value or the reduced value, wherein the message is used to poll for cached messages and is transmitted before the software stack is initialized.

2. The low power network device of claim 1, wherein the low power network device comprises a timer, and the duration of time is determined based on data from the timer.

3. The low power network device of claim 2, wherein the low power network device determines sunrise and sunset times and uses the data from the timer to determine whether it is daytime or nighttime.

4. The low power network device of claim 1, wherein the low power network device comprises a light sensor, and the duration of time is determined based on data from the light sensor.

5. The low power network device of claim 1, wherein the low power network device receives a message from a second network device instructing it to use the reduced value.

6. A network comprising:

a low power network device having a wireless network interface, a software stack that is used to transmit and receive messages over a wireless network interface and a memory device to store a default value of a PollTimeout parameter, wherein the low power network device has a hibernation mode and the PollTimeout parameter determines a maximum time that the low power network device remains in the hibernation mode;

a second network device having a wireless network interface; and a friend node, having a wireless network interface;

wherein the second network device transmits a first message using the wireless network interface, to the low power network device, instructing the low power network device to use a reduced value of the PollTimeout parameter, the reduced value being less than the default value;

wherein the friend node caches the first message for the low power network device if the low power network device is in a sleep mode when the second network device transmits the first message; and wherein the low power network device, upon exiting the sleep mode, transmits a message to the friend node to poll for cached messages, wherein the message is transmitted before the software stack has been initialized.

7. The network of claim 6, wherein the low power network device comprises a night light.

8. The network of claim 7, comprising:

a movement sensor having a wireless network interface;

wherein the movement sensor transmits a second message using the wireless network interface to the low power network device instructing it to enable the night light.

9. The network of claim 8, wherein the second network device transmits a third message using the wireless network interface to the movement sensor, the third message indicating day or night.

10. The network of claim 9, wherein the movement sensor only transmits the second message if it detects movement and determines that it is night time.

11. The network of claim 10, further comprising:

a second low power network device, wherein the second network device transmits the first message as a multicast message to the low power network device and the second low power network device.

12. The network of claim 11, wherein the movement sensor transmits the second message as a multicast message to the low power network device and the second low power network device.

13. The network of claim 7, wherein the second network device transmits the first message when it determines that it is night time.

14. The network of claim 6, wherein the second network device transmits another message to the low power network device instructing the low power network device to use the default value of the PollTimeout parameter.

15. A method of reducing latency in a low power network device, wherein the low power network device has a software stack that is used to transmit and receive messages over a wireless network interface, comprising:

determining the one or more most likely messages that the low power network device will transmit over the wireless network interface after awakening from hibernation mode;

constructing the one or more most likely messages in a first portion of memory that retains power during hibernation mode;

entering hibernation mode, wherein a processing unit and a second portion of the memory in the low power network device are powered off;

determining, after awakening from hibernation mode and before initializing the software stack, the reason for the awakening; and if the reason is expected, sending one of the constructed messages over the wireless network interface before initializing the software stack.

16. The method of claim 15, comprising:

if the reason is not expected, initializing the software stack; and creating and transmitting a new message after the software stack is initialized.

17. The method of claim 15, wherein the one or more most likely messages are constructed using encryption keys.

18. The method of claim 15, wherein the one or more most likely messages are constructed using a unique sequence number.

* * * * *